(12) United States Patent
Kollar et al.

(10) Patent No.: US 11,743,199 B2
(45) Date of Patent: Aug. 29, 2023

(54) IDENTIFICATION OF IP BLOCKS (BURSTS) AND IP LATENCY MEASUREMENT IN 5G

(71) Applicant: Nokia Technologies Oy, Espoo (FI)

(72) Inventors: Martin Kollar, Kosice (SK); Krzysztof Tatarczyk, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/209,408

(22) Filed: Mar. 23, 2021

(65) Prior Publication Data

US 2022/0311712 A1    Sep. 29, 2022

(51) Int. Cl.
*H04L 47/28* (2022.01)
*H04W 28/02* (2009.01)

(52) U.S. Cl.
CPC ......... *H04L 47/28* (2013.01); *H04W 28/0278* (2013.01)

(58) Field of Classification Search
CPC ....... H04W 24/08; H04W 8/24; H04W 24/02; H04W 24/10; H04W 76/15; H04W 36/0069; H04W 88/06; H04W 28/0278; H04L 47/28
See application file for complete search history.

(56) References Cited

U.S. PATENT DOCUMENTS

| | | | | |
|---|---|---|---|---|
| 2017/0064592 | A1* | 3/2017 | Cai | H04L 69/324 |
| 2021/0360449 | A1* | 11/2021 | Kim | H04W 24/08 |
| 2022/0078808 | A1* | 3/2022 | Luo | H04W 72/1231 |

OTHER PUBLICATIONS

Polese et al, "Integrated Access and Backhaul in 5G mmWave Networks: Potential and Challenges" 2020, IEEE (Year: 2020).*
"3rd Generation Partnership Project; Technical Specification Group Services and System Aspects; Management and orchestration; 5 G performance measurements (Release 17)", 3GPP TS 28.552 V17.1.0, Dec. 2020, 207 pages.
"3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 16)", 3GPP TS 32.450 V16.0.0, Jul. 2020, 16 pages.

(Continued)

*Primary Examiner* — Omer S Mian
(74) *Attorney, Agent, or Firm* — Harrington & Smith

(57) ABSTRACT

Example embodiments of the invention as disclosed herein provide at least a method an apparatus to perform communicating, by a network device of a communication network, at least one data burst comprising at least one data block towards an access node of the communication network, wherein the communicating includes: determining, a buffer status of a buffer for communicating the at least one data block with the access node; based on the determining, setting at least one value of at least one timer for each data block of the at least one data block, wherein said at least one timer is identifying at least one given time the buffer is reserved for each data block of said at least one data block; and based on at least said at least one given time, communicating the at least one data burst with the access node, wherein the at least one value of said at least one timer is determined based on a volume of each data block.

20 Claims, 10 Drawing Sheets

(56) References Cited

OTHER PUBLICATIONS

"3rd Generation Partnership Project; Technical Specification Group Radio Access Network; NR; Layer 2 Measurements; (Release 16)", 3GPP TS 38.314 V16.2.0, Dec. 2020, 20 pages.
"3rd Generation Partnership Project; Technical Specification Group Radio Access Network; NG-RAN; NR user plane protocol (Release 16)", 3GPP TS 38.425 V16.2.0, Sep. 2020, 25 pages.
"Buffered PDCP throughput measurement computation", Ericsson, 3GPP TSG-RAN3 Meeting #106, R3-197422, Nov. 2019, 4 pages.

* cited by examiner

Table 1

| Definition | Average IP latency in the DL per QoS group. This measurement is applicable for EN-DC and SA. This measurement refers to IP latency for DRBs. This measurement provides the average (arithmetic mean) time it takes to transmit first part of the IP block (burst) via air to UE from the time reception of the first part of the IP block (burst) in gNB. The measurement is done separately per QoS group.<br><br>Detailed Definition:<br>$L(T, QoSid) = \left[\frac{\sum_i tSent(i, QoSid) - tRec(i, QoSid)}{I(T)}\right]$, where explanations can be found in FIG. 6B Table 2 below. |
|---|---|

FIG. 6A

Table 2

| | |
|---|---|
| $L(T, QoSId)$ | IP Latency in the DL per QoS group, averaged during time period $T$. Unit: 0.1 ms. |
| $tRec(i, QoSId)$ | The point in time when the first part of the DL IP block (burst) i is received in the gNB (CU-UP).<br>Start of each new IP block (burst) is identified when new data arrived to gNB (CU-UP) into empty gNB buffer fo the given DRB. The gNB buffer is considered as non empty if either some data are kept in the PDCP layer (CU-UP) and/or not sent from DU to UE for the given DRB. The time interval the given part of the IP block (PDCP PDU i) spents in the DU until it is sent to UE is estimated as<br>$T_{PDCP\ PDU_{iDU}} = PDCP\ PDU_i Volume/DDR$ where<br>$PDCP\ PDU_i Volume$ is volume of the i-th PDCP PDU and DDR is the latest Desired Data Rate reported within the DL DATA DELIVERY STATUS (DDDS) from DU according to 3GPP TS 38.425. |
| $tSent(i, QoSId)$ | The point in time when the first part of the DL IP block (burst) i is sent over air to UE. |
| $i$ | An i-th DL IP block (burst) that arrives at the gNB (CU UP) during time period $T$. |
| $I(T)$ | Total number of DL IP block (burst) in the time period $T$. Start of each new IP block (burst) is identified when new data arrived to gNB (CU UP) into empty gNB buffer fo the given DRB. The gNB buffer is considered as non empty if either some data are kept in the PDCP layer (CU UP) and/or not sent from DU to UE for the given DRB. The time interval the given part of the IP block (PDCP PDU i) spents in the DU until its sent to UE is estimated as<br>$T_{PDCP\ PDU_{iDU}} = PDCP\ PDU_i Volume/DDR$ where<br>$PDCP\ PDU_i Volume$ is volume of the i-th PDCP PDU and DDR is the latest Desired Data Rate reported within the DL DATA DELIVERY STATUS (DDDS) according to 3GPP TS 38.425. End of IP block (burst) is identified when last portion of the data sent over air to UE which empties the gNB buffer fo the given DRB. |
| $T$ | Time Period during which the measurement is performed |
| $QoSId$ | The identity of the QoS group. |

FIG. 6B

IDENTIFICATION OF IP BLOCKS (BURSTS) AND IP LATENCY MEASUREMENT IN 5G

TECHNICAL FIELD

The teachings in accordance with the example embodiments of this invention relate generally to identification of DL IP blocks and measuring IP latency in radio technologies including 5G and, more specifically, relate to identification of DL IP blocks in CU-UP directly and measuring IP latency in a DL in radio technologies including 5G.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CU Control unit
CP Control plane
DDR Desired Data Rate
DDDS DL DATA DELIVERY STATUS
DU Distribution unit
E-UTRAN Evolved UTRAN
LTE Long Term 3GPP Evolution
MAC Medium Access Control
NG NG Interface between 5G Core and gNB
PDCP Packet Data Configuration Protocol
QoS Quality of Provided Services
RLC Radio Link Control
TB Transport block
TTI Time Transmission Interval
UE User Equipment
UP User plane Latency is one of the most important Key Performance Indicators (KPIs) used to monitor quality of services perceived by end user. The services provided by E-UTRAN are based on IP blocks delivery thus from the point of view what end user perceives it is crucial to measure it as an IP latency.

One main issue at the time of this application that prevents the 3GPP community to agree on IP Latency measurement definition in DL in 5G, is distributed type of network when CU and DU are acting as different nodes connected via F1 interface and in addition even within CU the CP and UP may be distributed and interconnected via E1 interface.

Thus, at the time of this application there not seen to be a way to identify with such different nodes the IP blocks (bursts) in PDCP layer (CU-UP) in 5G. In addition, the IP latency the 3GPP is completely silent about this type of IP latency measurement in 5G. For example as shown in 3GPP TS 28.552 version 17.1.0 only some delay measurements related to DU monitoring like "Average delay DL air-interface chapter 5.1.1.1.1" and "Average delay in RLC sublayer of gNB-DU chapter 5.1.3.3.3" of 3GPP specifications are available.

Example embodiments of the invention work to address at least some of these issues.

SUMMARY

This section contains examples of possible implementations and is not meant to be limiting.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: communicate, by a network device of a communication network, at least one data burst comprising at least one data block towards an access node of the communication network, wherein the communicating comprises: determining, a buffer status of a buffer for communicating the at least one data block with the access node. Based on the determining, set at least one value of at least one timer for each data block of the at least one data block, wherein said at least one timer is identifying at least one given time the buffer is reserved for each data block of said at least one data block. Then, based on at least said at least one given time, communicate the at least one data burst with the access node, wherein the at least one value of said at least one timer is determined based on a volume of each data block.

In another example aspect of the invention, there is a method comprising: communicating, by a network device of a communication network, at least one data burst comprising at least one data block towards an access node of the communication network, wherein the communicating comprises: determining, a buffer status of a buffer for communicating the at least one data block with the access node. Based on the determining, setting at least one value of at least one timer for each data block of the at least one data block, wherein said at least one timer is identifying at least one given time the buffer is reserved for each data block of said at least one data block. Then, based on at least said at least one given time, communicating the at least one data burst with the access node, wherein the at least one value of said at least one timer is determined based on a volume of each data block.

A further example embodiment is an apparatus and a method comprising the apparatus and the method of the previous paragraphs, wherein there is receiving information relating to a scheduling throughput associated with a latency for communicating the at least one data block with the access node, wherein the at least one value of said at least one timer is determined based on the volume of each data block and on the information relating to the scheduling throughput, wherein the network device comprises a distribution unit associated with a base station of the communication network, wherein a duration of the at least one data burst is based on a point of time of a first data block of said at least one data burst to a point of time of a last data block of the at least one data block communicated with said distributed unit, wherein the communicating is based on a calculated at least one value of said at least one timer for each data block, wherein a latency of the at least one data burst is determined based on a difference of time when the first data block is transmitted from the distribution unit and a reception of the first data block of the at least one burst into an empty buffer of a base station, wherein a latency of the at least one data burst is calculated based on a latency of the first data block of said at least one data block, wherein a latency of the at least one data burst is calculated based on a first data block timer of said at least one timer, wherein the latency is calculated with respect to the first data block reservation time, wherein the latency is calculated with respect to the first data block timer, wherein a combined latency is calculated based on a sum of latencies of the at least one data burst, wherein an average latency is given as a ratio of the combined latency of the at least one data burst and a sum of the at least one data burst during a measurement period, wherein a latency of the at least one data burst is based on a time it takes to transmit the first data block of the at least one data burst from a reception time of the first data block, wherein the measurement comprises:

$$L(T, QoSid) = \left\lfloor \frac{\Sigma_{\forall i} tSent(i, QoSid) - tRec(i, QoSid)}{I(T)} \right\rfloor,$$

wherein: L(T, QoSid) is an IP latency in a downlink per QoS group, averaged during time period T unit: 0.1. ms.; TRec(I, QoSid) is an interval of time a given part of an IP block spent in in DU until it is transmitted; TSent(I,QoSid) is a point in time when a first part of a DL IP Block (Burst) is sent over air to UE; i is an i-th DL IP Block (burst) that arrives at a network node (e.g., base station) during time period T; I(T) is a total number of IP Block (Burst) in time period T; T is a time period during which measurements are performed; and QoSid is an identity of a QoS group, wherein a start of each new IP block (burst) is identified when new IP block data spent in in DU is transmitted into empty buffer for a given DRB, wherein the buffer is considered as non empty if either some data are kept in the PDCP layer (CU-UP) and/or not sent from DU for the given DRB, wherein a time interval of a given part of the IP block (PDCP PDU i) spent in the DU until it is sent to UE is estimated as $T_{PDCP\ PDU_{iDU}}$=PDCP $PDU_i$Volume/DDR, wherein PDCP $PDU_i$Volume is volume of the i-th PDCP PDU and DDR is the latest Desired Data Rate reported within the DL DATA DELIVERY STATUS (DDDS) from DU, wherein a start of each new IP block (burst) is identified when new data arrived into empty buffer for a given DRB, wherein the buffer is considered as non empty if either some data are kept in the PDCP layer (CU UP) and/or not sent from DU to UE for the given DRB, and wherein a time interval a given part of an IP block spends in the DU until transmitted is estimated as $T_{PDCP\ PDU_{iDU}}$=PDCP $PDU_i$Volume/DDR where PDCP $PDU_i$Volume is volume of the i-th PDCP PDU and DDR is the latest Desired Data Rate reported within the DL DATA DELIVERY STATUS (DDDS), and wherein an end of IP block (burst) is identified when last portion of the data sent over air to UE which empties the buffer for the given DRB, wherein communicating the at least one data burst to the distribution unit comprises decreasing a number of the at least one data block to the distribution unit per bearer per measurement period, wherein the measurement period comprises a preconfigured time interval based on hundredths or thousandths of seconds, and/or wherein the at least one data burst is received from an access and mobility management function associated with a base station of the communication network.

A non-transitory computer-readable medium storing program code, the program code executed by at least one processor to perform at least the method as described in the paragraphs above.

In another example aspect of the invention, there is an apparatus comprising: means for communicating, by a network device of a communication network, at least one data burst comprising at least one data block towards an access node of the communication network, wherein the communicating comprises: means for determining, a buffer status of a buffer for communicating the at least one data block with the access node; means, based on the determining, for setting at least one value of at least one timer for each data block of the at least one data block, wherein said at least one timer is identifying at least one given time the buffer is reserved for each data block of said at least one data block; and means, based on at least said at least one given time, for communicating the at least one data burst with the access node, wherein the at least one value of said at least one timer is determined based on a volume of each data block.

In accordance with the example embodiments as described in the paragraph above, at least the means for communicating, determining, and setting comprises a network interface, and computer program code stored on a computer-readable medium and executed by at least one processor.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 6A shows a Table 1: Definition for Average IP latency in the DL per QoS group in accordance with example embodiments of the invention;

FIG. 6B shows a Table 2: Parameter description for IP Latency in the DL per QoS group in accordance with example embodiments of the invention;

DETAILED DESCRIPTION

In example embodiments of this invention there is proposed at least a method and apparatus to perform identification of DL IP blocks and measuring IP latency in a DL in radio technologies including 5G.

A latency is one of the most important Key Performance Indicators (KPIs) used to monitor quality of services perceived by end user. The services provided by E-UTRAN are based on IP blocks delivery thus from the point of view what end user perceives it is crucial to measure it as an IP latency.

Figure 1:
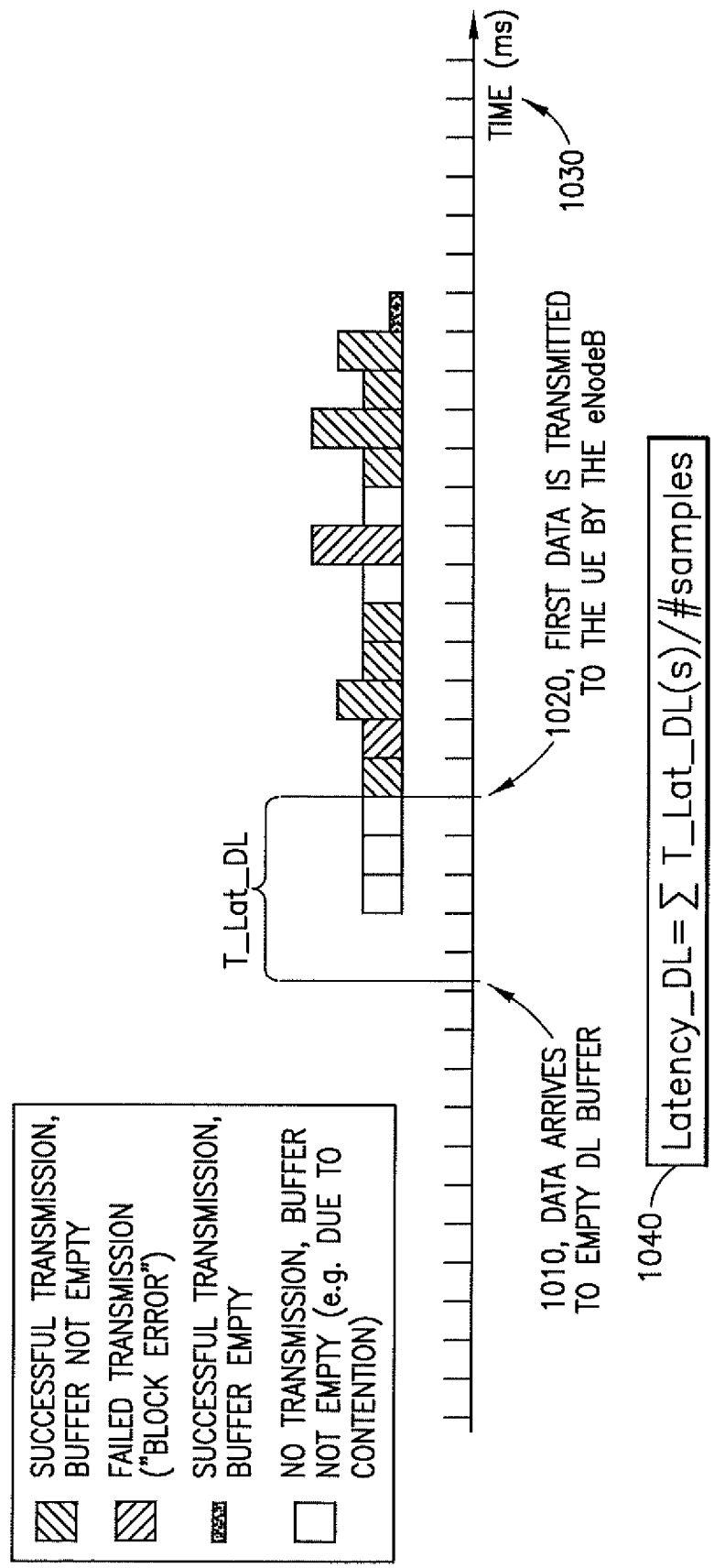
FIG. 1 shows a principle of IP Latency measurement in DL as shown in chapter 6.3.2.2 of 3GPP TS 32.450 v16.0.0.

In E-UTRAN the way how to measure so called "IP Latency" per QCI in DL direction is summarized in FIG. 1. FIG. 1 shows a principle of IP Latency measurement in DL as shown in chapter 6.3.2.2 of 3GPP TS 32.450 v16.0.0. FIG. 1 shows a principle of IP Latency measurement in DL using time in ms. as in item 1030 of FIG. 1. As shown in item 1010 of FIG. 1 data arrives to empty DL buffer. As shown in item 1020 of FIG. 1 first data is transmitted to the UE by the eNodeB. FIG. 1 shows indications of successful transmission buffer not empty, failed transmission (block error), successful transmission (buffer empty), and no transmission, buffer not empty due to contention. As shown in item 1040 of FIG. 1 Latency_DL=ΣT_Lat_DL(s)/#samples.

As similarly indicated above one main issue that prevents the 3GPP community to agree on IP Latency measurement definition in DL in 5G is distributed type of network when CU and DU are acting as different nodes connected via F1 interface and in addition even within CU the CP and UP may be distributed and interconnected via E1 interface. Thus, the PDCP layer located in CU-UP has no info about RLC and MAC layer that are in DU. Nor CU-UP is aware of segmentation of the PDCP PDUs into RLC PDUs in the DU and thus has no knowledge the given burst (may consists of couple of PDCP SDUs) is transmitted via one TTI or via couple of consequent TTIs. In other words said, the CU-UP is not able to identify the IP blocks (bursts) in similar way as E-UTRAN does for measurement of IP latency in DL as mentioned in the previous chapter 1. To make CU-UP aware of the situation in DU would mean to transmit all relevant info on each time stamp transmission of the related TB from DU which is not feasible as it would overload completely the F1-U interface with such info.

Currently there is no way how to identify the IP blocks (bursts) in PDCP layer (CU-UP) in 5G. In addition, the IP latency the 3GPP is completely silent about this type of IP latency measurement in 5G. Within the 3GPP TS 28.552 only some delay measurements related to within DU monitoring like "Average delay DL air-interface chapter 5.1.1.1.1" and "Average delay in RLC sublayer of gNB-DU chapter 5.1.3.3.3" are available.

Example embodiments of the invention are intended to solve the problem via proposing at least a new method for identification of DL IP blocks (bursts) in CU-UP directly and measuring IP latency in DL.

Figure 8:
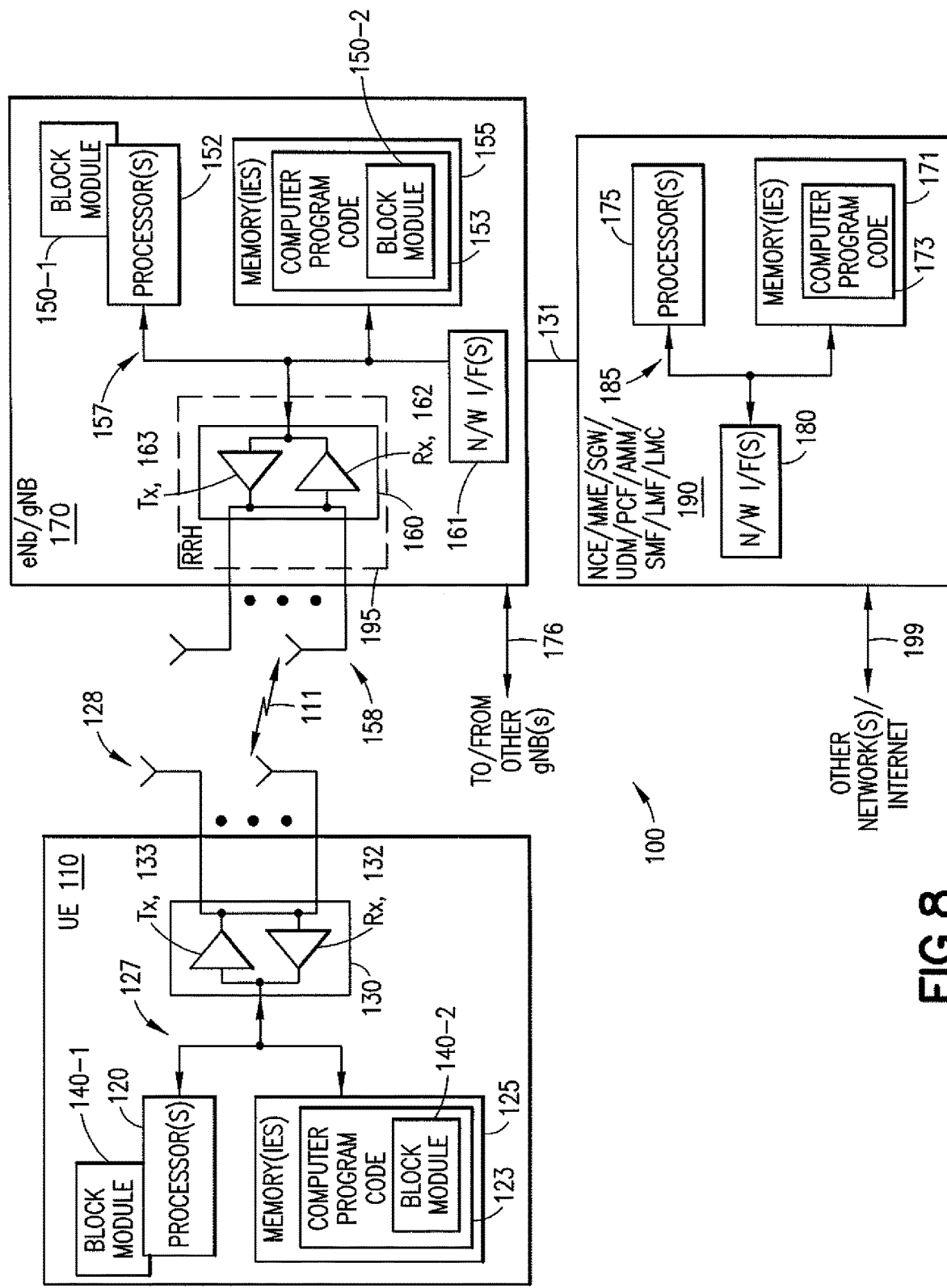
FIG. 8 shows a high level block diagram of various devices used in carrying out various aspects of the invention.

Before describing the example embodiments of the invention in further detail reference is made to FIG. 8. FIG. 8 shows a block diagram of one possible and non-limiting exemplary system in which the exemplary embodiments may be practiced.

As shown in FIG. 8, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an Block module 140 which is configured to perform the example embodiments of the invention as described herein. The Block module 140 may be implemented in hardware by itself of as part of the processors and/or the computer program code of the LIE 110. The Block module 140 comprising one of or both parts 140-1 and/or 140-2, which may be implemented in a number of ways. The Block module 140 may be implemented in hardware as Block module 140-1, such as being implemented as part of the one or more processors 120. The Block module 140-1 may be implemented also as an integrated circuit or through other hardware such as a programmable gate array. In another example, the Block module 140 may be implemented as Block module 140-2, which is implemented as computer program code 123 and is executed by the one or more processors 120. Further, it is noted that the Block modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes an Block module 150 which is configured to perform example embodiments of the invention as described herein. The Block module 150 may comprise one of or both parts 150-1 and/or 150-2, which may be implemented in a number of ways. The Block module 150 may be implemented in hardware by itself or as part of the processors and/or the computer program code of the gNB 170. Block module 150-1, such as being implemented as part of the one or more processors 152. The Block module 150-1 may be implemented also as an integrated circuit or through other hardware such as a programmable gate array. In another example, the Block module 150 may be implemented as Block module 150-2, which is implemented as computer program code 153 and is executed by the one or more processors 152. Further, it is noted that the Block modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or 5G Core functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF/LMF/LMC 190 as in FIG. 8.

It is noted that functionality(ies), in accordance with example embodiments of the invention, of any devices as shown in FIG. 8 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 8 at least via the wireless link 111 and/or via the NCE/MME/SGW/UDM/PCF/AMM/SMF/LMF/LMC 190 using link 199 to Other Network(s)/Internet as in FIG. 8.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Example embodiments of the invention can be divided into two parts. First one deals with a method for identification of the IP blocks (bursts) in PDCP layer of the CU-UP. The start of new IP block (burst) is identified each time IP data arrived from 5G Core to empty gNB buffer. End of the burst is identified when the gNB buffer becomes empty again. The time interval the gNB buffer is not empty starts in the point in time IP data (first PDCP SDU) arrived to empty gNB buffer until last part of the burst (last PDCP SDU of the burst) has been sent via air interface to UE from DU. In case the IP block consists of one PDCP SDU the IP block starts when the first part of the PDCP SDU arrived to PDCP layer (CU-UP) its duration continues until the related PDCP PDU is sent via F1-U interface from CU-UP to DU and ends when last part of the PDCP SDU is sent via air interface to UE. In case the IP block consists of more than one consequent PDCP SDUs exactly the same methodology is applied for each PDCP SDU, i.e. the IP block starts when the first part of the first PDCP SDU arrived to PDCP layer (CU-UP) its duration continues until the related PDCP PDU is sent via F1-U interface from CU-UP to DU which overlaps with either the second PDCP SDU is kept in the PDCP layer or kept in the DU, etc. and ends when last part of the last PDCP SDU is sent via air interface to UE.

The key part of example embodiments of the invention is how to measure the time the PDCP PDU will spend in DU until its last part is sent via air interface which is proposed to be done as per equation 1 (Eq. 1) below:

$$T_{PDCP\ PDU_i\ DU} = \frac{PDCP\ PDU\ \text{Volume}_i}{DU\ \text{scheduling}\ throughinput} \quad (1)$$

where PDCP PDU Volume$_i$ is the volume of I'th PDCP PDU frame sent from CU-UP to DU, and DU scheduling throughput is a scheduling throughput within DU measured as PDCP PDU volume sent from CU-UP divided with the time interval given as point in time the last part of the PDCP PDU sent via air interface minus point in time first part of the PDCP PDU sent from CU-UP to DU.

Second part of example embodiments of the invention deals with the IP latency measurement in 5G which is proposed to be has been sent via air interface from DU to UE minus point in time when first part of the first PDCP SDU of the IP block arrived to PDCP layer (CU-UP). To measure the time the PDCP PDU will spend in DU until its last part is sent via air interface is calculated based on Eq.1 as above.

Figure 2:
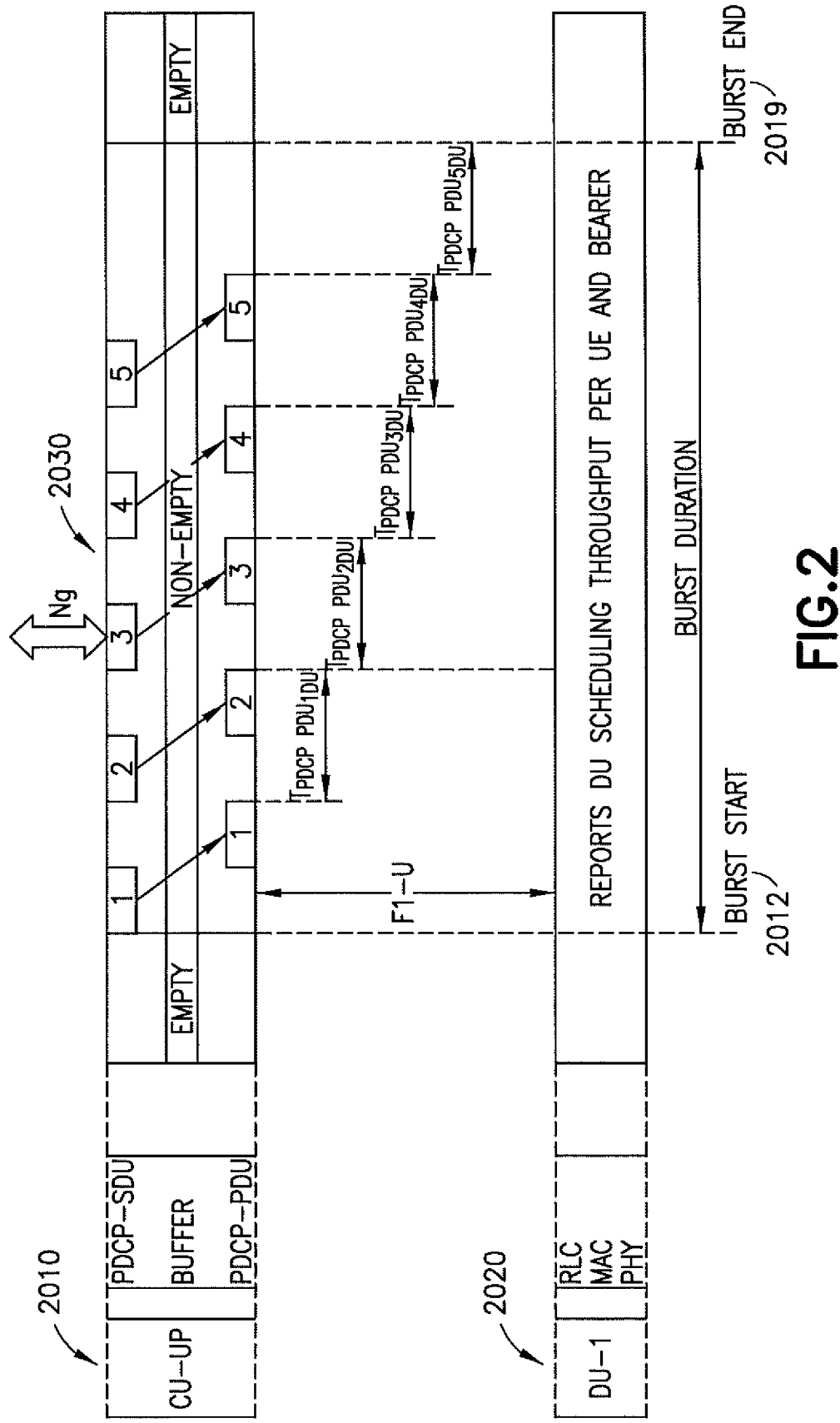
FIG. 2 shows principle of IP block (burst) identification in DL in an example for one DU.

FIG. 2 shows principle of IP block (burst) identification in DL in an example for one DU. Principle of the IP block (burst) identification in an example is demonstrated in the FIG. 2. It considers that transmission of the user data for the given bearer is done via one DU only. As shown in item 2030 of FIG. 2 there is an NG Interface between 5G Core (Ng), as shown in item 2010 of FIG. 2 there is CP-UP (control plane/user plane), and in item 2020 of FIG. 2 there is a DU-1 (distribution unit 1). As shown in item 2012 of FIG. 2 there is a burst start and in item 2019 of FIG. 2 a burst end, with an indication of a burst duration in between. During this duration of FIG. 2 there is shown bursts between a PDCP-SDU and a PDCP-PDU of the CU-UP 2010, where a buffer is shown as empty and non-empty in between. Following the bursts there is reporting DU scheduling throughput per UE and bearer.

Number of DUs allocated for the user data transmission of the related bearer can be more than two in general. The method principle in each case follows the idea of identification of the time the PDCP PDU will spend in the related DU until its last part is sent via air interface as calculated based on Eq.1 as above. As indicated in Eq. 1 this calculation is based on DU scheduling throughput which must be reported from DU to CU-UP via F1-U interface. As indicated above a massive and frequent F1-U message exchange between the DU and CU-UP is not feasible as it would overload the F1-U interface, therefore the Eq.1 shall relay on averaged value of DU scheduling throughput. It is recommended to communicate DU scheduling throughput per a configurable time interval (e.g. hundreds of ms.) from DU to CU-UP via F1-U interface The F1-U message exchange can be thus decreased to a reasonable number of messages per bearer per measurement period (15 minutes as a default) considering hundreds of ms. as configured time interval.

Figure 3:
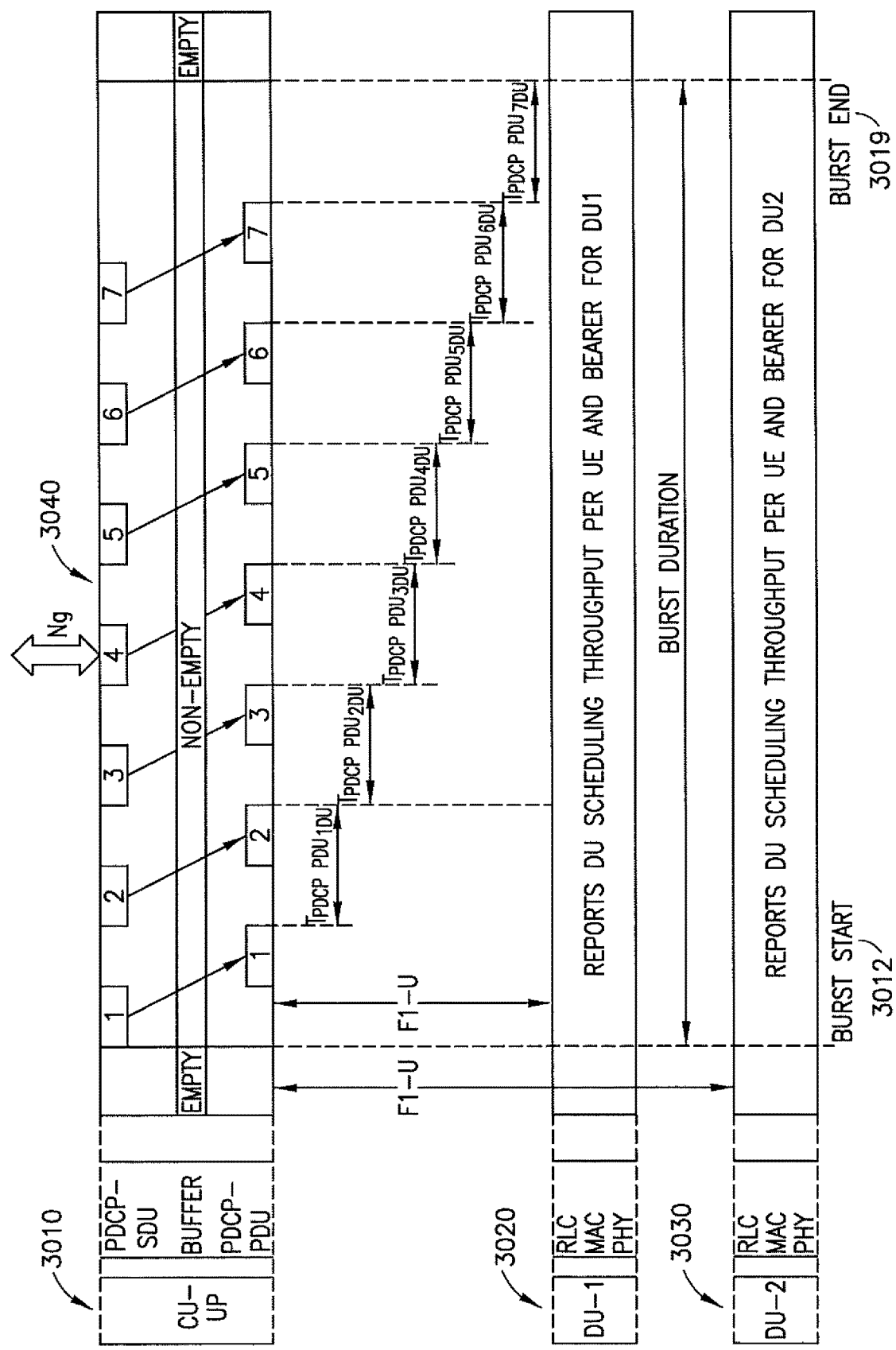
FIG. 3 shows principle of IP block (burst) identification in DL in an example for two DUs.

FIG. 3 shows principle of IP block (burst) identification in DL in an example for transmission of user data for a given bearer is done via two DUs. As shown in item 3040 of FIG. 3 there is Ng, as shown in item 3010 of FIG. 3 there is CP-UP (control plane/user plane), in item 3020 of FIG. 3 there is a DU-1 (distribution unit 1), and in item 3030 of FIG. 3 there is a DU-2 (distribution unit 2). As shown in item 3012 of FIG. 3 there is a burst start and in item 3019 of FIG. 3 a burst end. During a duration between the burst start and the burst end of FIG. 3 there is shown bursts between a PDCP-SDU and a PDCP-PDU of the CU-UP 3010, where a buffer is shown as empty and non-empty in between. Following the bursts as shown in items 3020 and 3030 there is reporting DU scheduling throughput per UE and bearer for DU-1 and DU-2.

Figure 4:
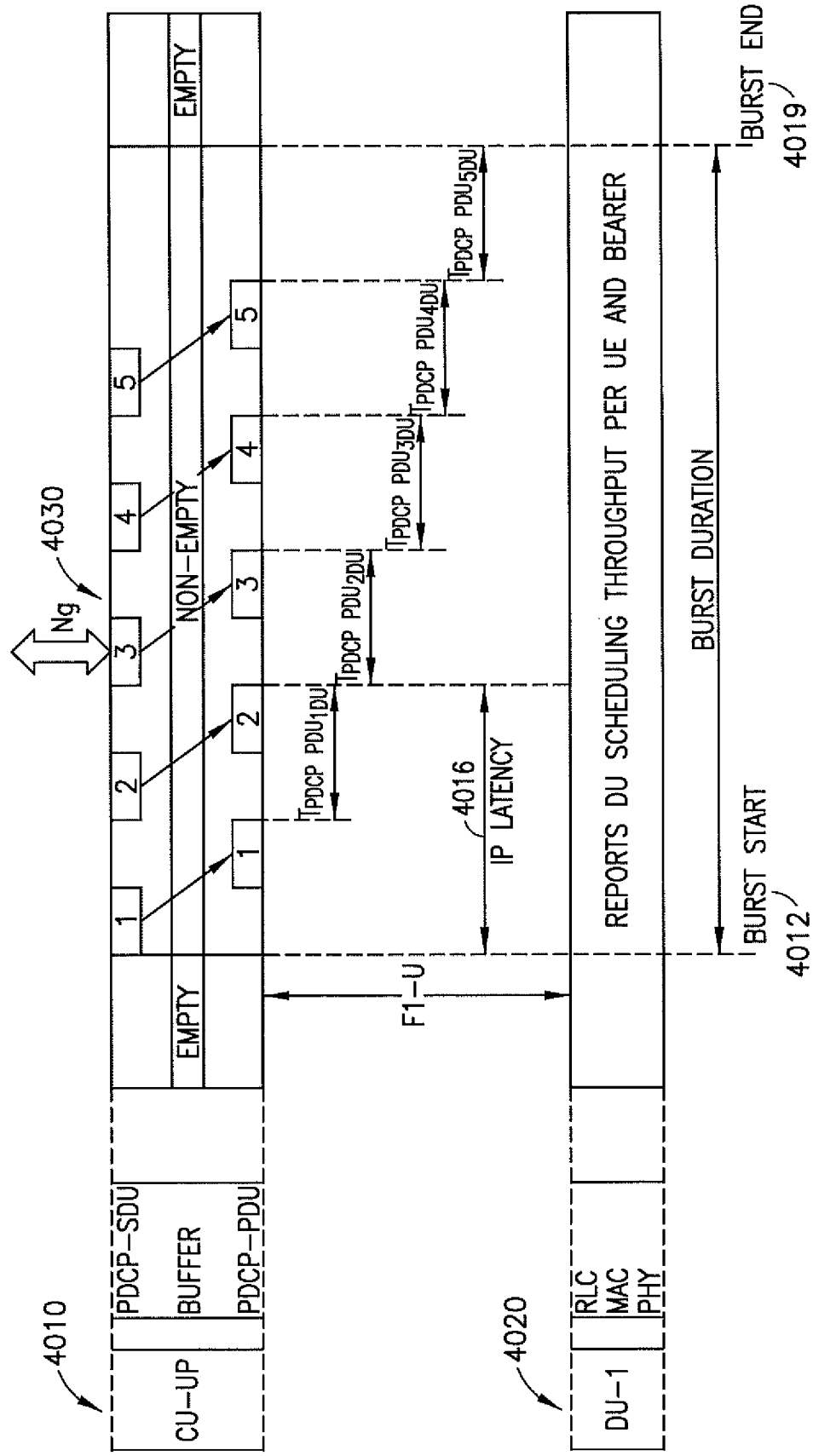
FIG. 4 shows principle of IP Latency measurement in DL in an example for one DU.

FIG. 4 shows principle of IP Latency measurement in DL in an example for transmission of user data for a given bearer is done via one DU. As shown in item 4030 of FIG. 4 there is Ng, as shown in item 4010 of FIG. 4 there is CP-UP (control plane/user plane), in item 4020 of FIG. 4 there is a DU-1 (distribution unit 1). As shown in item 4012 of FIG. 4 there is a burst start and in item 4019 of FIG. 4 a burst end. The burst start 4012 begins when the CP-UP buffer becomes non-empty as shown in FIG. 4. A time interval the CP-UP buffer is non-empty starts in the point in time IP data (first PDCP SDU) arrived to empty CP-UP buffer until the burst end 4019 (last PDCP SDU of the burst) has been sent via air interface to UE from DU. Further, as shown with item 4016 of FIG. 4 there is a dedicated item representing IP latency toward an end of the configurable time interval as discussed above and beginning at the burst start 4012. During a burst duration between the burst start and the burst end of FIG. 4 there is shown bursts between a PDCP-SDU and a PDCP-PDU of the CU-UP 4010, where a buffer is shown as empty and non-empty in between. Following the bursts as shown in item 4020 of FIG. 4 there is reporting DU scheduling throughput per UE and bearer for DU-1.

Figure 5:
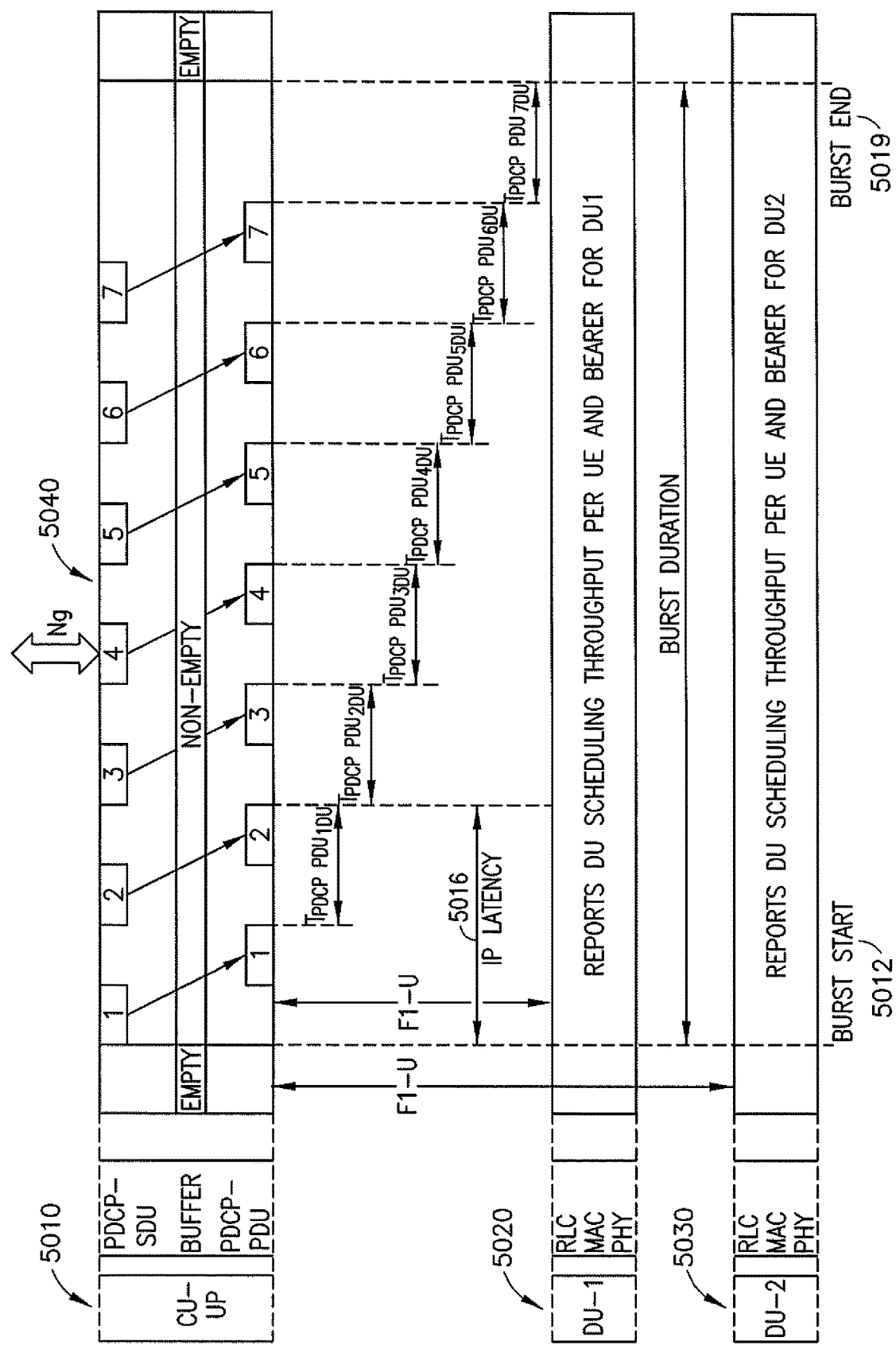
FIG. 5 shows principle of IP Latency measurement in DL in an example for two DUs.

FIG. 5 shows principle of IP Latency measurement in DL in an example for two DUs. A principle of the IP latency measurement for the given IP block (burst) in an example for transmission of the user data for the given bearer is done via two DUs is demonstrated in the FIG. 5. As shown in item 5040 of FIG. 3 there is Ng, as shown in item 5010 of FIG. 5 there is CP-UP (control plane/user plane), in item 5020 of FIG. 5 there is a DU-1 (distribution unit 1), and in item 5030 of FIG. 5 there is a DU-2 (distribution unit 2). As shown in item 5012 of FIG. 3 there is a burst start and in item 5019 of FIG. 5 a burst end. Similar to FIG. 4 in FIG. 5 the burst start 5012 begins when the CP-UP buffer becomes non-empty as shown in FIG. 5. A start for a time interval the CP-UP buffer is non-empty begins at a time IP data (first PDCP SDU) arrives to empty CP-UP buffer to make it non-empty until the burst end 5019 (last PDCP SDU of the burst) has been sent via air interface to UE from DU. Further, as shown with item 5016 of FIG. 5 there is a dedicated IP latency item toward an end of the configurable time interval as discussed above and beginning at the burst start 5012.

During a duration between the burst start and the burst end of FIG. 5 there is shown bursts between a PDCP-SDU and a PDCP-PDU of the CU-UP 5010, where a buffer is shown as empty and non-empty in between. Following the bursts as shown in items 5020 and 5030 there is reporting DU scheduling throughput per UE and bearer for DU-1 and DU-2.

In principle there are two alternatives how to get a DU scheduling throughput, First one is based on complete new implementation defined as PDCP PDU volume sent from CU-UP divided with the time interval given as point in time the last part of the PDCP PDU sent via air interface minus point in time first part of the PDCP PDU sent from CU-UP to DU. The DU scheduling throughput shall be provided per bearer and acting as an average throughput, i.e. covering all PDCP PDUs sent from CU-UP from the last reported value from DU to CU-UP. The second option is to reuse "Desired Data Rate" reported within the DL DATA DELIVERY STATUS (DDDS) according to chapter 5.5.2.2 in the 3GPP TS 38.425. The Desired Data Rate is then defined as "the amount of PDCP PDU data desired to be received in a specific amount of time. The amount of time is 1 sec" according to chapter 5.4.2.1 of the same 3GPP spec.

In accordance with example embodiments of the invention a timer such as a PDCP PDU transmission timer" can be a timer a timer the formula is converted to and/or using when moving to implementation of embodiments of the invention as disclosed herein. In addition it is indicated at least in FIG. 2, FIG. 3, and FIG. 4 an easier way to bind the time interval obtained using the formula is to run such a timer.

It is noted that there can be non-limiting points for operations in accordance with an example embodiment of the invention as described herein. These non-limiting points are as follows:

At a point 1 there is a start of each new IP block (burst) that can be identified each time IP data (first PDCP SDU) arrived from 5G Core to empty gNB buffer state, i.e., a state when PDCP buffer state related to CU UP is empty and no PDCP PDU transmission timer of the previous burst is running where the transmission timer is set individually for each PDCP PDU transmitted from CU UP to DU to the value given as ratio of the PDCP PDU volume and DU scheduling throughput representing amount of the volume of PDCP PDU level the DU is able to handle per one second and reported periodically from DU to CU UP.

As a point 2, related to previous point 1, a duration of each burst is evaluated from the point in time P data (first PDCP SDU) arrived from 5G Core to empty gNB buffer state which changes the buffer status to not empty until the point in time the gNB buffer status becomes empty again. Point 3 is related to points 1 and 2 above where at point 3 a sum of IP bursts is calculated during the measurement period. In a point 4, related to point 1 above, IP latency of each new burst is given as difference of the point in time first PDCP PDU transmission timer related to the burst expired minus the point in time IP data (first PDCP SDU) of the burst arrived from 5G Core to empty gNB buffer state. Related to points 1 and 4 sum of IP latency of all the bursts in the measurement period is calculated. In addition, related to points 1, 3 and 5 average IP latency on the measurement period is given aa ratio of the sum of IP latency of all the bursts in the measurement period and sum of IP bursts is calculated during the measurement period.

Example embodiments of the invention can focus on a Method for Identification of IP Blocks (Bursts) and IP Latency Measurement in 5G as given in the title of the invention. IP burst is defined as series of PDCP SDUs (IP packets) and as the whole with certain duration. The identification when new burst starts and previous one ends is based on a global buffer status of the node. For example, if IP packet arrived to empty gNB buffer we evaluate is as a start of new burst, then when last part of the burst is sent in DL and there are not any other data waiting for transmission, we evaluate it as empty buffer—i.e. end of the burst.

In previous technologies like 4G as all the layers PDCP, RLC and MAC are part of the common physical node (eNB) there was easy to see from PDCP layer how it looks with RLC and MAC part to evaluate when the eNB buffer status get empty/not empty. In 5G the situation is completely different due to decentralization of the gNb node (CU-UP and DU are physically on different places). To communicate the buffer status of DU to CU UP on each PDCP PDU transmission would completely kill the F1 interface between CU UP and DU. That's why CU UP (PDCP layer) is not aware of situation within DU. This currently prevents to define measurement of number of IP burst in DL and IP latency delay as in 4G. That's why the related spec 3GPP TS 38.314 is silent about the IP latency measurement. A lot of discussions driven within 3GPP community but currently an easy and acceptable solution not found.

As can be given in example embodiments of the invention a start of new IP block (burst) is identified each time IP data arrived from 5G Core to empty gNB buffer. An end of the burst is identified when the gNB buffer becomes empty again. A base station such as a gNB buffer is not empty when either PDCP Buffer is not empty or at least one PDCP PDU not yet transmitted via air interface to UE from the DU see at least FIG. 2 and FIG. 3.

The IP latency can be determined as basically a time interval between when a new IP packet arrives to an empty gNB buffer, till a first part transmitted via air interface from DU to UE, e.g., FIG. 4. These embodiments at least make it possible to identify and to measure the number of IP bursts in DL and measure IP latency is the same way as defined in the 3GPP for 4G without any extra and huge amount of message exchange between the CU UP and DU.

The objective of this measurement is to measure IP DL latency for OAM performance observability or for QoS verification of MDT or for the QoS monitoring.

FIG. 6A shows a Table 1: Definition for Average IP latency in the DL per QoS group in accordance with example embodiments of the invention.

As shown in Table 1 of FIG. 6A there is a definition of an average IP latency in the DL per QoS group. As shown in Table 1 of FIG. 6A this measurement is applicable for EN-DC and SA. This measurement refers to IP latency for DRBs. This measurement provides the average (arithmetic mean) time it takes to transmit first part of the IP block (burst) via air to UE from the time reception of the first part of the IP block (burst) in gNB. The measurement is done separately per QoS group.

Detailed Definition $$L(T, QoSid) = \left[ \frac{\Sigma_{i} tSent(i, QoSid) - tRec(i, QoSid)}{I(T)} \right],$$

where explanations can be found in the table 2 of FIG. 6B as shown below.

FIG. 6B shows a Table 2: Parameter description for IP Latency in the DL per QoS group in accordance with an example embodiment of the invention.

As shown in Table 2 of FIG. 6B:

| | |
|---|---|
| L(T, QoSid) | IP Latency in the DL per QoS group, averaged during time period T. Unit: 0.1 ms. |
| tRec(i, QoSid) | The point in time when the first part of the DL IP block (burst) i is received in the gNB (CU-UP). Start of each new IP block (burst) is identified when new data arrived to gNB (CU-UP) into empty gNB buffer for the given DRB. The gNB buffer is considered as non empty if either some data are kept in the PDCP layer (CU-UP) and/or not sent from DU to UE for the given DRB. The time interval the given part of the IP block (PDCP PDU i) spents in the DU until it is sent to UE is estimated as TPDCP PDU,DU = PDCP PDUiVolume/DDR where PDCP PDUi Volume is volume of the i-th PDCP PDU and DDR is the latest Desired Data Rate reported within the DL DATA DELIVERY STATUS (DDDS) from DU according to 3GPP TS 38.425. |
| tSent(i, QoSid) | The point in time when the first part of the DL IP block (burst) i is sent over air to UE. |
| i | An i-th DL IP block (burst) that arrives at the gNB (CU UP) during time period $_T$. |
| I(T) | Total number of DL IP block (burst) in the time period $_T$. Start of each new IP block (burst) is identified when new data arrived to gNB (CU UP) into empty gNB buffer for the given DRB. The gNB buffer is considered as non empty if either some data are kept in the PDCP layer (CU UP) and/or not sent from DU to UE for the given |

| | |
|---|---|
| | DRB. The time interval the given part of the IP block (PDCP PDU i) spents in the DU until its sent to UE is estimated as T*PDCP PDUibu* = PDCP PDU*i* Volume/DDR where PDCP PDU*i* Volume is volume of the i-th PDCP PDU and DDR is the latest Desired Data Rate reported within the DL DATA DELIVERY STATUS (DDDS) according to 3GPP TS 38.425. End of IP block (burst) is identified when last portion of the data sent over air to UE which empties the gNB buffer for the given DRB. |
| T | Time Period during which the measurement is performed |
| QoSid | The identity of the QoS group. |

Figure 7:
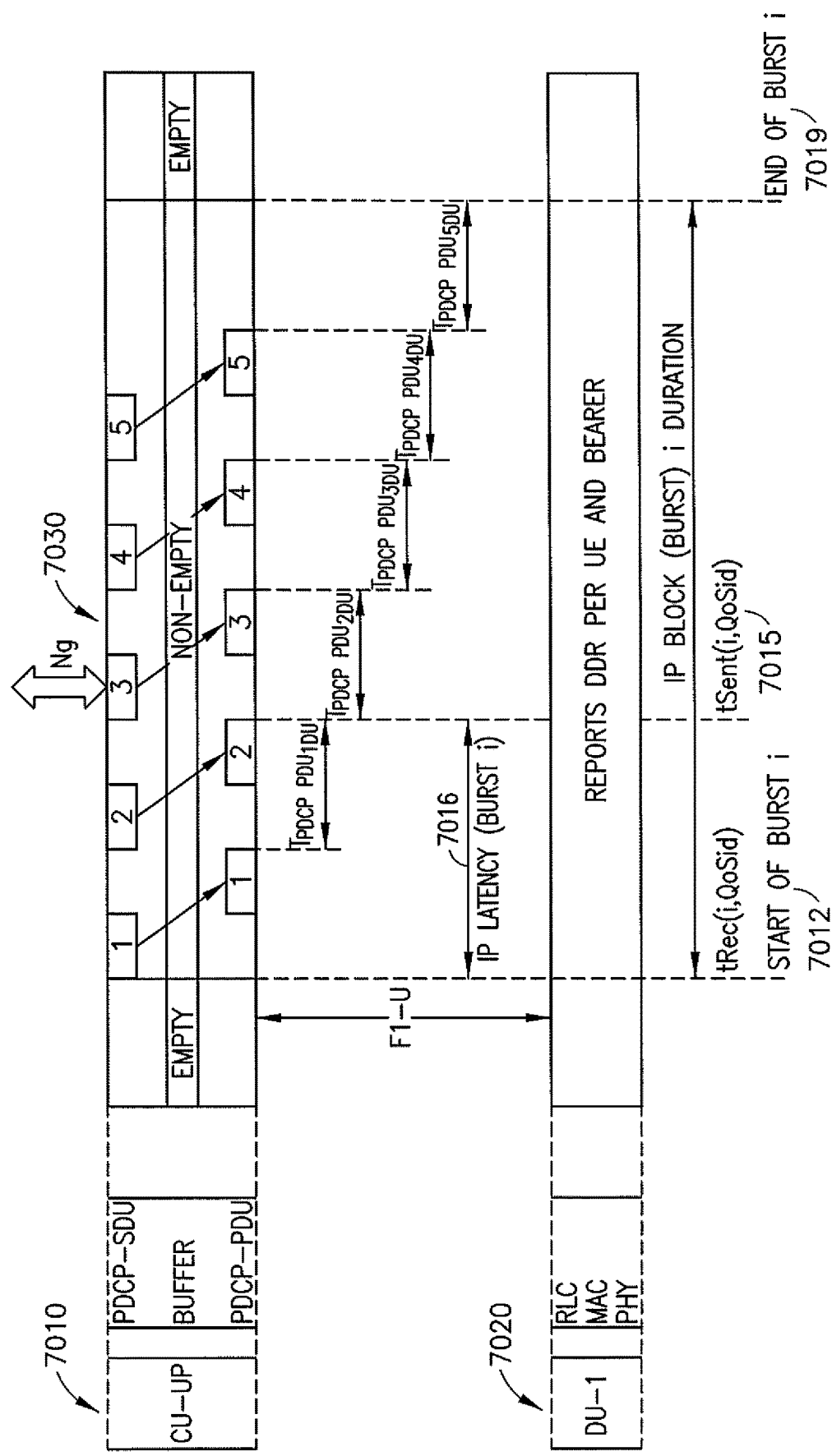
FIG. 7 shows a Figure: illustrating operations for Principle measurement for IP Latency in the DL per QoS group in accordance an example embodiment of the invention.

FIG. 7 shows a Figure illustrating operations for Principle measurement for IP Latency in the DL per QoS group in accordance with example embodiments of the invention. As shown in item 7030 of FIG. 7 there is Ng, as shown in item 7010 of FIG. 7 there is CP-UP (control plane/user plane), in item 7020 of FIG. 7 there is a DU-1 (distribution unit 1). As shown in item 7012 of FIG. 7 there is a burst start and in item 7019 of FIG. 7 a burst end. The burst start 7012 begins when the CP-UP buffer becomes non-empty as shown in FIG. 7. A time interval the CP-UP buffer is non-empty starts in the point in time IP data (first PDCP SDU) arrived to empty CP-UP buffer until the burst end 7019 (last PDCP SDU of the burst) has been sent via air interface to UE from DU. Further, as shown with item 7016 of FIG. 7 there is a dedicated item representing IP latency toward an end of the configurable time interval as discussed above and beginning at the burst start 7012. During a burst duration between the burst start and the burst end of FIG. 7 there is shown item 7015 indicating IP Block duration with a sent (I,QoSid). Following the bursts as shown in item 7020 of FIG. 7 there is reporting DDR per UE and bearer for DU-1.

Figure 9:
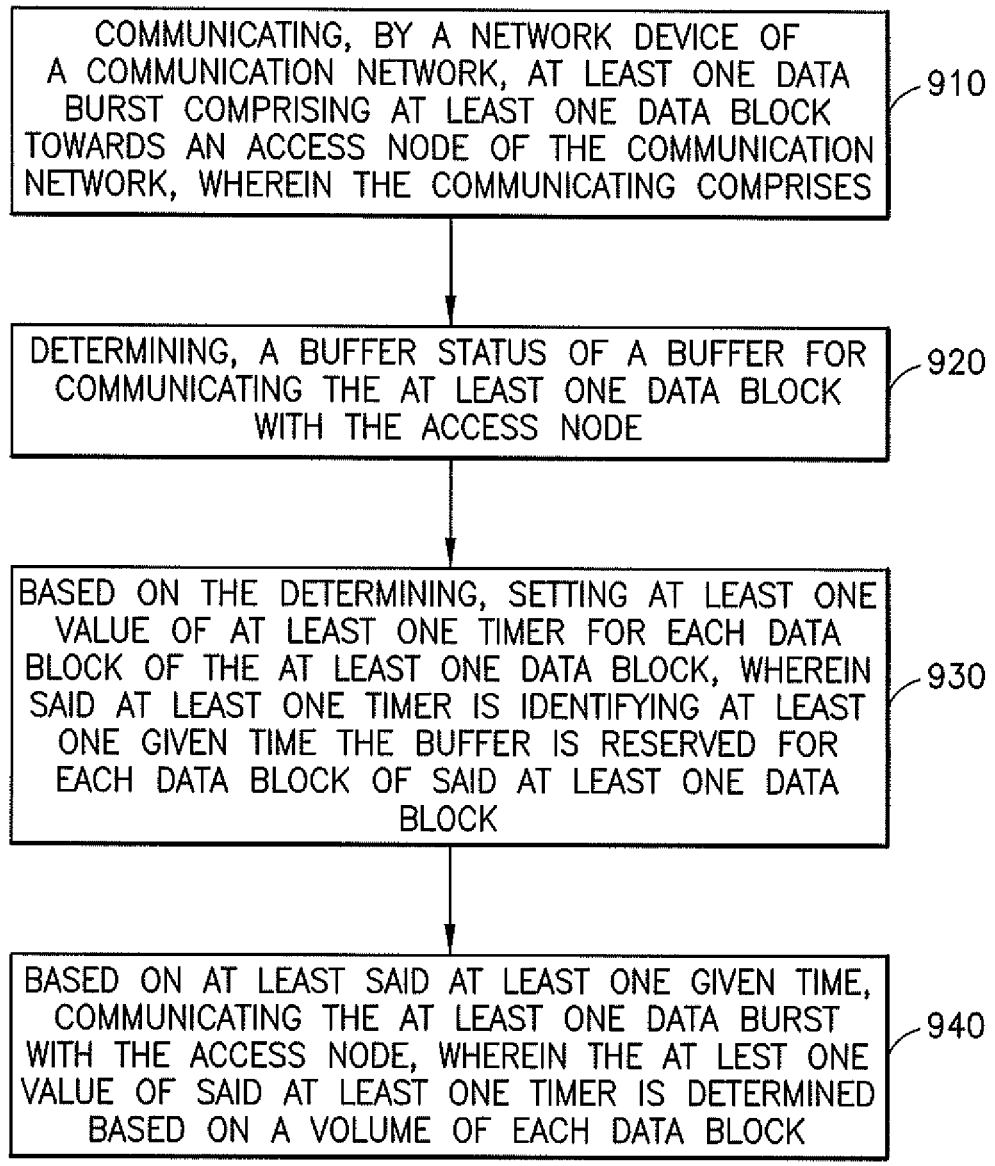
FIG. 9 shows at least a method in accordance with example embodiments of the invention which may be performed by an apparatus.

FIG. 9 shows at least a method in accordance with example embodiments of the invention which may be performed by an apparatus.

FIG. 9 illustrates operations which may be performed by a network device such as, but not limited to, a network node eNB/gNB 170 as in FIG. 8 or an eNB. As shown in step 910 of FIG. 9 there is communicating, by a network device of a communication network, at least one data burst comprising at least one data block towards an access node of the communication network, wherein the communicating comprises: as shown in step 920 of FIG. 9 determining, a buffer status of a buffer for communicating the at least one data block with the access node. As shown in step 930 of FIG. 9 there is, based on the determining, setting at least one value of at least one timer for each data block of the at least one data block, wherein said at least one timer is identifying at least one given time the buffer is reserved for each data block of said at least one data block. Then as shown in step 940 of FIG. 9 there is, based on at least said at least one given time, communicating the at least one data burst with the access node, wherein the at least one value of said at least one timer is determined based on a volume of each data block.

In accordance with the example embodiments as described in the paragraph above, there is receiving information relating to a scheduling throughput associated with a latency for communicating the at least one data block with the access node, wherein the at least one value of said at least one timer is determined based on the volume of each data block and on the information relating to the scheduling throughput.

In accordance with the example embodiments as described in the paragraphs above, wherein the network device comprises a distribution unit associated with a base station of the communication network.

In accordance with the example embodiments as described in the paragraphs above, wherein a duration of the at least one data burst is based on a point of time of a first data block of said at least one data burst to a point of time of a last data block of the at least one data block communicated with said distributed unit.

In accordance with the example embodiments as described in the paragraphs above, wherein the communicating is based on a calculated at least one value of said at least one timer for each data block.

In accordance with the example embodiments as described in the paragraphs above, wherein a latency of the at least one data burst is determined based on a difference of time when the first data block is transmitted from the distribution unit and a reception of the first data block of the at least one burst into an empty buffer of a base station.

In accordance with the example embodiments as described in the paragraphs above, wherein a latency of the at least one data burst is calculated based on a latency of the first data block of said at least one data block.

In accordance with the example embodiments as described in the paragraphs above, wherein a latency of the at least one data burst is calculated based on a first data block timer of said at least one timer.

In accordance with the example embodiments as described in the paragraphs above, wherein the latency is calculated with respect to the first data block reservation time.

In accordance with the example embodiments as described in the paragraphs above, wherein the latency is calculated with respect to the first data block timer.

In accordance with the example embodiments as described in the paragraphs above, wherein a combined latency is calculated based on a sum of latencies of the at least one data burst.

In accordance with the example embodiments as described in the paragraphs above, wherein an average latency is given as a ratio of the combined latency of the at least one data burst and a sum of the at least one data burst during a measurement period.

In accordance with the example embodiments as described in the paragraphs above, wherein a latency of the at least one data burst is based on a time it takes to transmit the first data block of the at least one data burst from a reception time of the first data block, wherein the measurement comprises:

$$L(T, QoSid) = \left\lfloor \frac{\Sigma_{\forall i} tSent(i, QoSid) - tRec(i, QoSid)}{I(T)} \right\rfloor.$$

In accordance with the example embodiments as described in the paragraphs above, wherein: L(T, QoSid) is an IP latency in a downlink per QoS group, averaged during time period T unit: 0.1. ms.; TRec(I, QoSid) is an interval of time a given part of an IP block spent in in DU until it is transmitted; TSent(I,QoSid) is a point in time when a first part of a DL IP Block (Burst) is sent over air to UE; i is an i-th DL IP Block (burst) that arrives at a network node (e.g., base station) during time period T; I(T) is a total number of IP Block (Burst) in time period T; T is a time period during which measurements are performed; and QoSid is an identity of a QoS group.

In accordance with the example embodiments as described in the paragraphs above, wherein a start of each new IP block (burst) is identified when new IP block data spent in in DU is transmitted into empty buffer for a given DRB, wherein the buffer is considered as non empty if either some data are kept in the PDCP layer (CU-UP) and/or not sent from DU for the given DRB, wherein a time interval of a given part of the IP block (PDCP PDU i) spent in the DU until it is sent to UE is estimated as $T_{PDCP\ PDU_{iDU}}$=PDCP PDU$_i$Volume/DDR, wherein PDCP PDU$_i$Volume is volume of the i-th PDCP PDU and DDR is the latest Desired Data Rate reported within the DL DATA DELIVERY STATUS (DDDS) from DU.

In accordance with the example embodiments as described in the paragraphs above, wherein a start of each new IP block (burst) is identified when new data arrived into empty buffer for a given DRB, wherein the buffer is considered as non empty if either some data are kept in the PDCP layer (CU UP) and/or not sent from DU to UE for the given DRB, and wherein a time interval a given part of an IP block spends in the DU until transmitted is estimated as $T_{PDCP\ PDU_{iDU}}$=PDCP PDU$_i$Volume/DDR where PDCP PDU$_i$Volume is volume of the i-th PDCP PDU and DDR is the latest Desired Data Rate reported within the DL DATA DELIVERY STATUS (DDDS), and wherein an end of IP block (burst) is identified when last portion of the data sent over air to UE which empties the buffer for the given DRB.

In accordance with the example embodiments as described in the paragraphs above, wherein communicating the at least one data burst to the distribution unit comprises decreasing a number of the at least one data block to the distribution unit per bearer per measurement period.

In accordance with the example embodiments as described in the paragraphs above, wherein the measurement period comprises a preconfigured time interval based on hundredths or thousandths of seconds.

In accordance with the example embodiments as described in the paragraphs above, wherein the at least one data burst is received from an access and mobility management function associated with a base station of the communication network.

A non-transitory computer-readable medium (Memory(ies) 155 of FIG. 8) storing program code (Computer Program Code 153 and/or Block Module 150-2 as in FIG. 8), the program code executed by at least one processor (Processor(s) 120 and/or Block Module 150-1 as in FIG. 8) to perform the operations as at least described in the paragraphs above.

In accordance with an example embodiment of the invention as described above there is an apparatus comprising: means for communicating (one or more transceivers 160, Memory(ies) 155, Computer Program Code 153 and/or Block Module 150-2, and Processor(s) 120 and/or Block Module 150-1 as in FIG. 8), by a network device (eNB/gNB 170 as in FIG. 8) of a communication network(Network 100 as in FIG. 8), at least one data burst comprising at least one data block towards an access node of the communication network, wherein the communicating comprises: means for determining (one or more transceivers 160, Memory(ies) 155, Computer Program Code 153 and/or Block Module 150-2, and Processor(s) 120 and/or Block Module 150-1 as in FIG. 8), a buffer status of a buffer for communicating the at least one data block with the access node. Based on the determining, means for setting (one or more transceivers 160, Memory(ies) 155, Computer Program Code 153 and/or Block Module 150-2, and Processor(s) 120 and/or Block Module 150-1 as in FIG. 8) at least one value of at least one timer for each data block of the at least one data block, wherein said at least one timer is identifying at least one given time the buffer is reserved for each data block of said at least one data block; and means, based on at least said at least one given time, for communicating (one or more transceivers 160, Memory(ies) 155, Computer Program Code 153 and/or Block Module 150-2, and Processor(s) 120 and/or Block Module 150-1 as in FIG. 8) the at least one data burst with the access node, wherein the at least one value of said at least one timer is determined based on a volume of each data block.

In the example aspect of the invention according to the paragraph above, wherein at least the means for communicating, determining, and setting comprises a non-transitory computer readable medium [Memory(ies) 155 as in FIG. 8] encoded with a computer program [Computer Program Code 153 and/or Block Module 150-2 as in FIG. 8] executable by at least one processor [Processor(s) 120 and/or Block Module 150-1 as in FIG. 8].

The method proposed in accordance with example embodiments of this invention is beneficial, because it keeps the logic of IP Latency in DL in 5G in the same manner as in E-UTRAN on one side and it also keeps some extra message needed for this method on F1-U interface on minimum possible level. Regarding the communication of the DU scheduling throughput as an average value per a configurable time interval (e.g. hundreds of ms.) from DU to CU-UP via F1-U interface and not per each burst following the logic how IP latency is defined, which is also an averaged latency, it shall not impact the precision of the obtained latency values using this method.

The method proposed in accordance with example embodiments of this invention allows to obtain quite very detailed picture of the situation inside the DU about the time stamp when the each PDCP PDU are transmitted via air interface to UE without any information on the time stamp transmitted from DU to CU UP. What may only be needed is DU scheduling throughput reported from DU to CU UP which is reported with low frequency. Last but not least is that example embodiments of the invention solves a real world issue seen as a gap in 3GPP.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is intended to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
  communicating, by a control unit of a communication network, at least one data burst comprising at least one data block towards a distributed unit of the communication network, wherein the communicating comprises:
  determining, a buffer status of a buffer of the control unit for communicating the at least one first data block of at least one data burst with the distributed unit;
  based on the determining, setting at least one value of at least one timer for each first data block of the at least one data burst, wherein said at least one timer is identifying at least one given time of a buffer of the distributed unit reserved for each first data block of said at least one first data block of the at least one data burst; and
  based on at least said at least one given time, communicating the at least one first data block of the at least one data burst with the distributed unit, wherein the at least one value of said at least one timer is determined based on a volume of each first data block, and scheduling throughput capacity of the distributed unit,
  wherein said at least one timer is set individually for each first data burst for the at least one data burst to the at least one value given as a ratio of the volume and the scheduling throughput capacity of the distributed unit.

2. An apparatus comprising:
   at least one processor; and
   at least one memory including computer program code, where the at least one memory and the computer program code are configured, with the at least one processor, to cause the apparatus to at least:
   communicate, by a control unit of a communication network, at least one data burst comprising at least one data block towards a distributed unit of the communication network, wherein the communicating comprises:
   determine, a buffer status of a buffer of the control unit for communicating the at least one first data block of at least one data burst with the distributed unit;
   based on the determining, set at least one value of at least one timer for each first data block of the at least one data burst, wherein said at least one timer is identifying at least one given time of a buffer related to of the distributed unit reserved for each first data block of said at least one first data block of the at least one data burst; and
   based on at least said at least one given time, communicate the at least one first data block of the at least one data burst with the distributed unit, wherein the at least one value of said at least one timer is determined based on a volume of each first data block and scheduling throughput capacity of the distributed unit,
   wherein said at least one timer is set individually for each first data burst for the at least one data burst to the at least one value given as a ratio of the volume and the scheduling throughput capacity of the distributed unit.

3. The apparatus of claim 2, wherein the scheduling throughput capacity is associated with a latency for communicating the at least one data block with the access node.

4. The apparatus of claim 3, wherein the distribution unit associated with a base station of the communication network.

5. The apparatus of claim 2, wherein a duration of the at least one data burst is based on a point of time of a first data block of said at least one data burst to a point of time of a last data block of the at least one data block communicated with said distribution unit.

6. The apparatus of claim 2, wherein the communicating is based on a calculated at least one value of said at least one timer for each data block.

7. The apparatus of claim 2, wherein a latency of the at least one data burst is determined based on a difference of time when the first data block is transmitted from the distribution unit and a reception of the first data block of the at least one burst into an empty buffer of a base station.

8. The apparatus of claim 2, wherein a latency of the at least one data burst is calculated based on a latency of the first data block of said at least one data block.

9. The apparatus of claim 2, wherein a latency of the at least one data burst is calculated based on a first data block timer of said at least one timer.

10. The apparatus of claim 2, wherein the-a latency is calculated with respect to the first data block reservation time.

11. The apparatus of claim 2, wherein the latency is calculated with respect to the first data block timer.

12. The apparatus of claim 2, wherein a combined latency is calculated based on a sum of latencies of the at least one data burst.

13. The apparatus of claim 1, wherein an average latency is given as a ratio of the combined latency of the at least one data burst and a sum of the at least one data burst during a measurement period.

14. The apparatus of claim 2, wherein a latency of the at least one data burst is based on a time it takes to transmit the first data block of the at least one data burst from a reception time of the first data block, wherein the measurement comprises:

$$L(T, QoSid) = \left\lfloor \frac{\Sigma_{\forall i} tSent(i, QoSid) - tRec(i, QoSid)}{I(T)} \right\rfloor,$$

wherein tSent(I,QoSid) is a point in time when a first part of a downlink internet protocol Block or burst is sent over air to user equipment and tRec (i, QoSid) is an interval of time a given part of an Internet protocol block spent in a distribution unit until it is transmitted,
   wherein: L(T, QoSid) is an Internet protocol latency in a downlink per quality of service group, averaged during time period T unit: 0.1 ms;
   i is an i-th downlink internet protocol Block (burst) that arrives at a network node (e.g., base station) during time period T;
   I(T) is a total number of Internet protocol Block (Burst) in time period T;
   T is a time period during which measurements are performed; and
   QoSid is an identity of a quality of service group.

15. The apparatus of claim 14, wherein a start of each new Internet protocol block (burst) is identified when new Internet protocol block data spent in in distribution unit is transmitted into empty buffer for a given data radio bearer, wherein the buffer is considered as non empty if either some data are kept in the packet data convergence protocol layer (CU-UP) and/or not sent from distribution unit for the given data radio bearer, wherein a time interval of a given part of the Internet protocol block (packet data convergence protocol protocol data unit i) spent in the distribution unit until it is sent to user equipment is estimated as $T_{PDCP\ PDU_{iDU}}=$ PDCP PDU$_i$Volume/DDR, wherein PDCP PDU$_i$Volume is volume of the i-th packet data convergence protocol protocol data unit and desired data rate is the latest Desired Data Rate reported within the DOWNLINK DATA DELIVERY STATUS (DDDS) from distribution unit.

16. The apparatus of claim 14, wherein a start of each new Internet protocol block (burst) is identified when new data arrived into empty buffer for a given data radio bearer, wherein the buffer is considered as non empty if either some data are kept in the packet data convergence protocol layer (CU UP) and/or not sent from distribution unit to user equipment for the given data radio bearer, and wherein a time interval a given part of an Internet protocol block spends in the distribution unit until transmitted is estimated as
   $T_{PDCP\ PDU_{iDU}}=$PDCP PDU$_i$Volume/DDR where PDCP PDU$_i$Volume is volume of the i-th packet data convergence protocol protocol data unit and desired data rate is the latest Desired Data Rate reported within the DOWNLINK DATA DELIVERY STATUS (DDDS), and wherein an end of Internet protocol block (burst) is identified when last portion of the data sent over air to user equipment which empties the buffer for the given data radio bearer.

17. The apparatus of claim 2, wherein communicating the at least one data burst to the distribution unit comprises decreasing a number of the at least one data block to the distribution unit per bearer per measurement period.

18. The apparatus of claim 12, wherein the measurement period comprises a preconfigured time interval based on hundredths or thousandths of seconds.

19. The apparatus of claim 2, wherein the at least one data burst is received from an access and mobility management function associated with a base station of the communication network.

20. A non-transitory computer readable memory comprising program code executable by at least one processor to perform:

communicating, by a control unit of a communication network, at least one data burst comprising at least one data block towards an a distributed unit of the communication network, wherein the communicating comprises:

determining, a buffer status of a buffer of the control unit for communicating the at least one first data block of at least one data burst with the access node distributed unit; based on the determining, setting at least one value of at least one timer for each first data block of the at least one data burst, wherein said at least one timer is identifying at least one given time of a buffer of the distributed unit reserved for each first data block of said at least one first data block of the at least one data burst; and based on at least said at least one given time, communicating the at least one first data block of the at least one data burst with the distributed unit, wherein the at least one value of said at least one timer is determined based on a volume of each first data block, and scheduling throughput capacity of the distributed unit, wherein said at least one timer is set individually for each first data burst for the at least one data burst to the at least one value given as a ratio of the volume and the scheduling throughput capacity of the distributed unit.

\* \* \* \* \*